United States Patent Office 3,161,625
Patented Dec. 15, 1964

3,161,625
DESOLVATED Rb AND Cs TRIPHENYL METHIDE CATALYST AND PROCESS OF POLYMERIZING STYRENE THEREWITH
Michael J. Vignale, Lunenburg, Mass., assignor to Monsanto Company, a corporation of Delaware
No Drawing. Filed Sept. 22, 1961, Ser. No. 139,860
5 Claims. (Cl. 260—93.5)

This invention relates to the manufacture of isotactic polystyrene. More particularly, it relates to a novel class of anionic catalysts for the synthesis of isotactic polystyrenes possessing levels of isotacticity approaching those obtained with Zeigler catalysts.

Polymerizates prepared using Zeigler catalysts require rather extensive and costly post-treatment to remove aluminum and titanium salts. As a result, recovery and purification of the polymer represent a disproportionately high part of the total manufacturing costs. Unfortunately, industry has had little choice but to use Zeigler catalysts in the manufacture of isotactic polystyrene since they provide polystyrenes having about the highest level of isotacticity currently available.

Alkali metal polyphenylmethides have long been recognized to be useful catalysts in the anionic polymerization of styrene. However, when so used under conventional anionic process conditions, the polymers obtained contain little or no isotacticity. It has now been found that certain alkali metal polyphenylmethides can be treated to render them effective in the production of styrene polymers possessing levels of isotacticity approaching those commonly associated with Zeigler catalyst processes.

Accordingly, it is an object of this invention to provide novel catalysts for the production of isotactic polystyrenes.

Another object is the provision of a novel anionic polymerization system for preparing styrene polymers having a high degree of isotacticity.

These and other objects are attained by desolvating an alkali metal polyphenylmethide of the class hereinafter set forth, incorporating the same in catalytic quantities into an aliphatic hydrocarbon solution of styrene monomer, and effecting polymerization of said styrene monomer at a temperature of from about −10 to 70° C.

Alkali metal polyphenylmethides are conventionally prepared by reduction of polyphenylmethyl chlorides in a polar solvent in the presence of the alkali metal. Other reported processes also call for the use of the polar solvent. Thus, alkali metal polyphenylmethides are obtained as solvates of the polar solvent. Until now, the desolvation of these solvated alkali metal polyphenylmethides has been of academic interest only since the solvates are perfectly efficient catalysts in their own right. However, it has now been found that when rubidium or cesium polyphenylmethides are desolvated, they can be used in anionic polymerization systems to prepare styrene polymers having a high degree of isotacticity.

The following examples are presented in illustration of the invention and are not intended as limitations thereof.

Examples I–IV, following, are exemplary of the desolvation of rubidium and cesium polyphenylmethides.

Example I

Ten grams of the dimethoxyethane solvate of rubidium triphenylmethide are charged to a suitable vessel equipped with a vacuum line. The system is heated to a temperature of about 60° C. under a vacuum sufficient to yield an absolute pressure of about 100 mm. of mercury and is maintained under these conditions for about 24 hours. Upon removal from the vessel, the crystalline powder is observed to have changed from its original bright red color to a dark maroon. Quantitative analysis via hydrolysis and titration of the resulting base indicates that the material is essentially pure rubidium triphenylmethide with substantially no trace of dimethoxyethane present.

Example II

Ten grams of the tetrahydrofuran solvate of rubidium diphenylmethide are charged to a vessel as in Example I. After heating at about 90° C. under a pressure of about 50 mm. of mercury for 20 hours, the crystalline powder is observed to have changed from its original bright red color to a dark maroon. Quantitative analysis as in Example I indicates that the material is essentially pure rubidium diphenylmethide with substantially no trace of tetrahydrofuran present.

Example III

Five grams of the ammonia solvate of rubidium triphenylmethide are dissolved in 50 ml. of dimethoxyethane. The solvent is evaporated by boiling under a partial vacuum. The resulting crystalline dimethoxyethane desolvate of rubidium triphenylmethide is then processed as in Example I to yield substantially the identical product.

Example IV

Five grams of the ethyl ether solvate of cesium triphenylmethide are charged to a vessel as in Example I. After heating at about 70° C. under a pressure of about 200 mm. of mercury for 15 hours, the crystalline powder is observed to have changed from its original bright red color to a dark maroon. Quantitative analysis as in Example I indicates that the material is essentially pure cesium triphenylmethide with substantially no trace of ethyl ether present.

The alkali metal polyphenylmethides suitable for use in the practice of this invention are rubidium and cesium polyphenylmethides corresponding to the general formula:

In this formula, M is, of course, rubidium or cesium; each R is, independently, either a phenyl group or an alkylphenyl group containing from 7 to 10 carbon atoms; and $R_1$ may be either hydrogen, an alkyl group containing from 1 to 3 carbon atoms or one of the above defined R groups. Exemplary of this class of materials are the rubidium and cesium triphenylmethides and the rubidium diphenylmethide portrayed in Examples I–IV, supra. However, substantially equivalent results are obtained with, for example, rubidium tris-(paramethylphenyl)-methide, cesium bis-(paramethylphenyl)methane, cesium 1,1-diphenylethane, rubidium 1,1-diphenylbutane, rubidium 1,1-diphenylpentane, etc.

As hereinabove discussed, these alkali metal polyphenylmethides are obtained as solvates of the polar solvent in which they have been prepared. Common polar solvents employed include liquid ammonia, tetrahydrofuran, dimethoxyethane, ethyl ether, dioxane, etc. The presence of any such polar solvent in association with these alkali metal polyphenylmethides renders them incapable of producing isotactic polystyrenes. However, by desolvating these alkali metal polyphenylmethides they are converted to among the most efficient of the available catalysts for preparing isotactic polystyrene.

Desolvation of these solvated alkali metal polyphenylmethides is accomplished by heating them at a temperature of at least 60° C. to drive off the solvated polar solvent. The exact temperature employed need only be sufficient to overcome the forces holding the polar solvent to the alkali metal polyphenylmethide and gasify said polar solvent. The higher boiling polar solvents and/or the more polar of these polar solvents will require the use of higher temperatures. Temperatures on the order of 150–180° C. have been employed with satisfactory results and materially aid in accelerating the rate of desolvation. It has also been found that the use of a vacuum will accelerate the desolvation. For some reason, not fully understood, the nature of the polar solvent present in the initial solvated alkali metal polyphenylmethide significantly influences their efficiency in directing the formation of isotactic polystyrene. The desolvates prepared from dimethoxyethane or tetrahydrofuran solvates appear to be most effective in inducing isotacticity, whereas those derived by desolvating the ammonia solvates are least effective. Therefore, in a preferred embodiment, ammonia solvates of alkali metal polyphenylmethides are first converted to the corresponding dimethoxyethane or tetrahydrofuran solvates, according to the method shown in Example III, and then desolvated.

An unexpected advantage of these desolvated alkali metal polyphenylmethides lies in the discovery that they possess excellent storage stability. For example, rubidium triphenylmethide stored under a nitrogen atmosphere has been observed to be stable over a period of 6 months without loss of its catalytic activity or loss of its specificity to the synthesis of high isotactic polystyrenes.

Examples V–VIII, following, show the efficacy of these desolvated alkali metal polyphenylmethides in the anionic polymerization of styrene to polymers of high isotacticity.

*Example V*

One hundred grams (about 1 mol) of styrene and about 860 grams (about 10 mols) of hexane are charged to a suitable reaction vessel. To this are added 7 grams (about 0.02 mol) of the desolvated rubidium triphenylmethide prepared in Example III. The system is sealed under a nitrogen atmosphere, raised to a temperature of about 70° C. and maintained thereat, amid continuous stirring, for 80 hours. The system is cooled to about room temperature and the living polymer is quenched with about 10 ml. of methanol. The polymeric solids are recovered by filtration, washed with water and dried in a hot-air oven. About 17 grams of solid polystyrene are obtained, indicating a yield of about 17% based upon monomer charged. Maximum crystallinity of the isotactic fraction of the polymer is developed by boiling the same in heptane for about 10 hours. The yield of isotactic polystyrene is then determined by extracting the recovered and dried polystyrene solids in boiling, ca. 80° C., methyl ethyl ketone for 8 hours. About 11.3 grams of the polymeric solids are found to be insoluble in the boiling methyl ethyl ketone, indicating that about 63% of the polymeric solids obtained are isotactic polystyrene.

*Example VI*

Example V is repeated, employing substantially an equal molar proportion (i.e., 10 grams) of the dimethoxyethane solvate of rubidium triphenylmethide in place of the desolvated form thereof employed in said Example V. About 25 grams of solid polystyrene are obtained. These polymeric solids are boiled first in heptane and then in methyl ethyl ketone as in Example V. All of the polymer is found to be soluble in the boiling methyl ethyl ketone, indicating that substantially no isotactic polystryene was formed.

*Example VII*

One hundred grams (about 1 mol) of styrene and about 860 grams (about 10 mols) of hexane are charged to a suitable reaction vessel. To this are added 2.5 grams (about 0.01 mol) of the desolvated rubidium diphenylmethide prepared in Example II. The system is sealed under a nitrogen atmosphere and maintained at room temperature (ca. 20–25° C.), amid continuous stirring, for about 15 days. The system is cooled to about room temperature and the living polymer is quenched with about 10 ml. of methanol. The polymeric solids are recovered by filtration, washed with water and dried in a hot-air oven. About 33 grams of solid polystyrene are obtained, indicating a yield of about 33% based upon monomer charged. The polymeric solids are treated as in Example V to develop maximum crystallinity and extract the isotactic polystyrene therefrom. About 25 grams of the polymeric solids are found to be insoluble in the boiling methyl ethyl ketone, indicating that about 75% of the polymeric solids obtained are isotactic polystyrene.

*Example VIII*

Example V is repeated, employing substantially an equal molar proportion (i.e., 8 grams) of the desolvated cesium triphenylmethide prepared in Example IV in place of the desolvated rubidium triphenylmethide employed in said Example V. About 50 grams of solid polystyrene are obtained. These polymeric solids are treated as in Example V to develop maximum crystallinity and extract the isotactic polystyrene therefrom. About 24 grams of the polymeric solids are found to be insoluble in the boiling methyl ethyl ketone, indicating that about 48% of the polymeric solids obtained are isotactic polystyrene.

The process of this invention has regard to the use of the designated desolvated alkali metal polyphenylmethides as anionic catalysts in the polymerization of styrene to polymers possessed of appreciable degrees of isotacticity. The anionic polymerization system comprises styrene monomer and catalytic proportions (e.g., up to about 0.1 mol per mol of styrene) of one of the designated desolvated alkali metal polyphenymethides dissolved in an excess of an aliphatic hydrocarbon solvent. While hexane is most commonly employed, such alkanes as pentane, isopentane, heptane, octane, isooctane, decane, etc., may be employed with equivalent results. Polymerization is affected at temperatures of from about −10 to 70° C.; the rate of polymerization of course increasing with increasing temperature. Since polystyrene is preferably polymerized under in inert, e.g., nitrogen, atmosphere to avoid oxidation and decomposition of the styrene, the reaction vessel is usually sealed and polymerization effected under at least autogenous pressure. While economic considerations dictate against the use of high pressures, anionic polymerization of styrene at superatmospheric pressures make it possible to employ such lower alkanes as methane, butane, etc., as the aliphatic hydrocarbon solvent.

The boiling methyl ethyl ketone technique is perhaps the most stringent of the available test methods for determining the percent of isotactic polystyrene present in a given mass of polystyrene. It has its basis in the fact that crystalline isotactic polystyrene is insoluble in boiling methyl ethyl ketone. Thus, if meaningful results are to be obtained, the maximum crystallinity of the isotactic fraction of the polymeric mass must first be developed. This can be accomplished, as shown in the examples by lengthy heating in a medium in which the total polymeric mass has only low solubility. The resulting swelling of the polymeric mass facilitates orientation and crystallization. Polystyrene chains containing a significant degree of crystallinity are insoluble in boiling methyl ethyl ketone whereas ordinary atactic polystyrenes or polystyrene chains of very low crystallinity are readily soluble therein. Thus, the percentage of methyl ethyl ketone insolubles is a measure of the percentage of total polystyrene chains which contain sufficient crystallinity (by virtue of their isotacticity) to render them insoluble in boiling methyl ethyl ketone. As the foregoing examples demonstrate, anionic polymerization, using a solvated rubidium triphenylmethide results in a polystyrene devoid of isotacticity (Example VI) whereas, under exactly the same conditions, the desolvated rubidium triphenylmethide gives a polystyrene of about 63% isotacticity. Polymers containing 75% of isotactic polystyrene are possible under the practice of this invention (Example VII). This corresponds to approximately 20–25% crystallinity in the total mass of the styrene polymer. Therefore, polystyrenes approaching the 100% isotacticity, or about 30% maximum crystallinity, obtained with Zeigler catalysts are obtainable through the practice of this invention.

In comparing the results obtained through practice of this invention with Zeigler catalyst processes, it is believed that the ease of recovery of the isotactic polystyrenes from the polymerization systems taught herein, more than offsets the decrease in isotacticity of the polymer obtained. However, if a more isotactic polymer is sought, the boiling methyl ethyl ketone technique taught in the preceding paragraph can be used to upgrade the polymer to one of almost 100% isotacticity.

It is obvious that many variations are possible in the products and processes hereinbefore described without departing from the spirit and scope of this invention.

What is claimed is:

1. A method for preparing isotactic styrene polymers by anionic polymerization in aliphatic hydrocarbon media which comprises contacting styrene monomer with catalytic quantities of desolvated alkali metal polyphenylmethides in said media at temperature of from $-10$ to $70°$ C. under an inert atmosphere; said desolvated alkali metal polyphenylmethides corresponding to the general formula:

wherein M is an alkali metal selected from the group consisting of rubidium and cesium, each R is a radical independently selected from the group consisting of phenyl and alkylphenyl groups containing from 7 to 10 carbon atoms, and $R_1$ is a radical selected from the group consisting of hydrogen, alkyl groups containing from 1 to 3 carbon atoms and R groups.

2. A method as in claim 1 wherein the aliphatic hydrocarbon solvent is hexane.

3. A method as in claim 2 wherein the desolvated alkali metal polyphenylmethide is desolvated rubidium triphenylmethide.

4. A method as in claim 2 wherein the desolvated alkali metal polyphenylmethide is desolvated cesium triphenylmethide.

5. An anionic catalyst for the polymerization of styrene to isotactic polystyrene which comprises a desolvated alkali metal polyphenylmethide corresponding to the general formula:

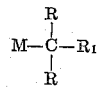

wherein M is an alkali metal selected from the group consisting of rubidium and cesium, each R is a radical independently selected from the group consisting of phenyl and alkylphenyl groups containing from 7 to 10 carbon atoms, and $R_1$ is a radical selected from the group consisting of hydrogen, alkyl groups containing from 1 to 3 carbon atoms and R groups.

References Cited in the file of this patent

UNITED STATES PATENTS

| | | |
|---|---|---|
| 2,751,426 | Closson et al. | June 19, 1956 |
| 2,914,578 | Nobis et al. | Nov. 24, 1959 |
| 2,931,792 | Aries | Apr. 5, 1960 |
| 2,960,544 | Mador et al. | Nov. 15, 1960 |
| 2,963,471 | Herman | Dec. 6, 1960 |
| 3,110,706 | Vollmert et al. | Nov. 12, 1963 |

OTHER REFERENCES

Williams et al.: Journal of Organic Chem., vol. 23, #4, pp. 638–639, April 1958.

J.A.C.S., vol. 45 (1923), pages 2756–2763.